(12) United States Patent
Kuhl et al.

(10) Patent No.: US 8,583,176 B2
(45) Date of Patent: Nov. 12, 2013

(54) AUTOMATIC AUDIO ROUTING DEPENDENT ON DOCK STATE

(75) Inventors: Larry Kuhl, Waterloo (CA); Anton Epp, Breslau (CA); Greg Bentz, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 293 days.

(21) Appl. No.: 12/349,391

(22) Filed: Jan. 6, 2009

(65) Prior Publication Data

US 2010/0173672 A1 Jul. 8, 2010

(51) Int. Cl.
*H04B 1/38* (2006.01)
*H04M 1/00* (2006.01)

(52) U.S. Cl.
USPC ........................................ 455/557; 455/569.1

(58) Field of Classification Search
USPC .............................................. 455/557, 569.1
See application file for complete search history.

(56) References Cited

U.S. PATENT DOCUMENTS

| 6,631,098 | B2* | 10/2003 | Chang et al. ....................... 369/7 |
| 6,751,446 | B1 | 6/2004 | Kim et al. |
| 7,433,715 | B2 | 10/2008 | Buckley et al. |
| 2002/0168999 | A1 | 11/2002 | Lin et al. |
| 2005/0156753 | A1 | 7/2005 | DeLine et al. |
| 2005/0239496 | A1* | 10/2005 | Sylvain ....................... 455/552.1 |
| 2007/0135185 | A1* | 6/2007 | Dvorak et al. .............. 455/575.2 |
| 2008/0070516 | A1 | 3/2008 | Lee et al. |
| 2008/0177904 | A1 | 7/2008 | Storey et al. |
| 2009/0174760 | A1* | 7/2009 | Basmadjian et al. ....... 348/14.01 |
| 2009/0176540 | A1* | 7/2009 | Do et al. ..................... 455/575.2 |
| 2009/0318198 | A1* | 12/2009 | Carroll ....................... 455/569.1 |

OTHER PUBLICATIONS

Apple iPhone Dock. iLounge.com online review. www.ilounge.com/index.php/reviews/entry/apple-iphone-dock/. Jul. 26, 2007.
Brando Treo 650 Music Dock Review. Rohdesign.com online catalog. www.rohdesign.com/weblog/archives/001645.html. Jan. 26, 2006.
Brando Multi Function Dock Speakers. "Telecoms". Softpedia.com online catalog. www.news.softpedia.com/news/Brando-Multi-Functional-Dock-Speakers-42825.shtml. Dec. 20, 2006.

* cited by examiner

*Primary Examiner* — Kent Chang
*Assistant Examiner* — Scott Au
(74) *Attorney, Agent, or Firm* — Quarles & Brady LLP (57) ABSTRACT

A mobile communication device with various operation modes and a method of toggling the operation modes thereof is disclosed. The operational mode of the mobile communication device can be automatically changed as the result of a docking or undocking event of the mobile communication device with a docking station. During the docking or undocking of the mobile communication device with the docking station, the mobile communication device is conditionally toggled between a speakerphone operation mode and a non-speakerphone operation mode such as a handset operation mode, a headset operation mode and the like.

12 Claims, 5 Drawing Sheets

Fig. 5 ns, BlackBerry™
AUTOMATIC AUDIO ROUTING DEPENDENT ON DOCK STATE

BACKGROUND OF THE INVENTION

The present invention relates generally to mobile communication devices. More specifically, the present invention is directed to a method of conditionally toggling between operation modes for a mobile communication device.

In addition to other data services, most mobile communication devices, such as cellular phones, BlackBerry™ devices, and the like, provide phone service. Typically, when an end user uses the mobile communication device as a phone, the mobile communication device serves as a handset. The user holds the handset close to her head such that a speaker is placed proximate her ear to provide audio and an internal microphone is placed proximate her mouth to receive her voice. However, during a phone call, it may be inconvenient for the user to hold the handset to her head as this occupies one of her hands.

One way of providing hands-free operation of the mobile communication device has been to provide a built-in speakerphone mode. In speakerphone mode, the speaker volume and the microphone sensitivity are adjusted such that the mobile communication device does not need to be closely held to the head of the user. The user can set down the mobile communication device and continue the phone call while simultaneously performing some other task, such as writing, that would be difficult if she were still holding the handset against her head. Further, when in speakerphone mode, multiple individuals can participate in the phone call using only a single handset.

To toggle between speakerphone and handset operation modes, the user enters the command in the mobile communication device by the manipulation of a control. Typically, to switch to speakerphone mode during a phone call, the user presses a button on the device that toggles the mobile communication device between handset operation and speakerphone operation. To switch back to handset operation, the user presses this button again.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

A mobile communication device is disclosed that can automatically change an operation mode as the result of a docking or undocking event of the mobile communication device in a docking station. During the docking or undocking of the mobile communication device with the docking station, the mobile communication device is conditionally toggled between a speakerphone operation mode and a non-speakerphone operation mode (e.g., a handset operation mode, a headset operation mode or the like).

The mobile communication device includes a detector and a controller. The detector is configured to detect a docking state of the mobile communication device in the docking station. The controller is configured to conditionally toggle the mobile communication device between a speakerphone operation mode and a non-speakerphone operation mode depending, at least in part, on the docking state of the mobile device.

In toggling the operation mode, the mobile communication device may examine a number of conditions of the mobile communication device in addition to the docking state. These other conditions include, but are not limited to, a previous undocked operational mode, whether a headset is coupled to the mobile communication device, and whether the user has set the mobile communication device to bypass the speakerphone operation mode.

In this way, an appropriate operation mode of the mobile communication device is selected for the action of the user. For example, an action such as docking the mobile communication device in the docking station can automatically switch the mobile communication device from a non-speakerphone operation mode to a speakerphone operation mode. Then, when the mobile communication device is removed from the docking station, the mobile communication device may return to its pre-docked operational state. Thus, the docking or undocking of the mobile communication device in the docking station automatically routes the audio in a manner consistent with the way in which the user is using the mobile communication device with minimal additional instruction on the part of the user.

A method of toggling between operational modes for a mobile communication device is disclosed. The method includes providing a mobile communication device having a speakerphone operation mode and a non-speakerphone operation mode, providing a docking station for selectively receiving the mobile communication device, and conditionally toggling the mobile communication device between the speakerphone operation mode and the non-speakerphone operation mode based on a docking state of the mobile communication device in the docking station.

In one form of the method, the method may further include the step of detecting the docking state of the mobile communication device before conditionally toggling the mobile communication device.

In another form of the method, when the mobile communication device is docked in the docking station, the docking station may recharge the mobile communication device.

In yet another form of the method, when the mobile communication device is docked in the docking station, the docking station may transmit data with the mobile communication device.

In still yet another form of the method, the method may further include switching the mobile communication device from the non-speakerphone operation mode to the speakerphone operation mode when the mobile communication device changes from an undocked state to a docked state.

In still another form of the method, the method may also include switching the mobile communication device from the speakerphone operation mode to the non-speakerphone operation mode when the mobile communication device changes from a docked state to an undocked state.

According to one form of the method, the method further includes storing an undocked operational mode of the mobile communication device, the undocked operational mode being one of the speakerphone operation mode and the non-speakerphone operation mode; docking the mobile communication device in the docking station and setting the mobile communication device to speakerphone operation mode; and undocking the mobile communication device in the docking station and setting the mobile communication device to the undocked operational mode.

In another form, non-speakerphone operation mode is a handset operation mode.

In still yet another form, the method further includes providing a headset coupled to the mobile communication device. In this form, the non-speakerphone operation mode is a headset operation mode. The step of conditionally toggling the mobile communication device may include detecting whether the mobile communication device is set to bypass the speakerphone operation mode.

A mobile communication device adapted to be selectively received in a docking station is also disclosed. The mobile communication device has a speakerphone operation mode and a non-speakerphone operation mode. The mobile communication device includes a detector configured to detect a docking state of the mobile communication device in the docking station. The mobile communication device also includes a controller configured to conditionally toggle the mobile communication device between the speakerphone operation mode and the non-speakerphone operation mode depending on the docking state of the mobile communication device.

In one form of the mobile communication device, when the mobile communication device is changed from an undocked state to a docked state, the controller may be configured to toggle the mobile communication device to speakerphone operation mode. In another form of the mobile communication device, when the mobile communication device is changed from a docked to an undocked state, the controller may be configured to toggle the mobile communication device to the non-speakerphone operation mode.

Further, in one form, the mobile communication device may include a memory configured to store an undocked operational mode of the mobile communication device. The undocked operational mode is one of the speakerphone operation mode and the non-speakerphone operation mode. When the mobile communication device changes from a docked state in which the mobile communication device is set to speakerphone operation mode to an undocked state, the controller may be configured to set the mobile communication device to the undocked operation mode. The controller may further include a user control for selecting the undocked operational mode of the mobile communication device.

In one form of the mobile communication device, the non-speakerphone operation mode is a handset operation mode.

In still yet another form of the mobile communication device, the non-speakerphone mode is a headset operation mode. In this form, a headset is coupled to the mobile communication device. The controller may further include a bypass that selects whether to toggle to speakerphone operation mode when the mobile communication device is placed in a docked state.

To the accomplishment of the foregoing and related ends, the disclosure, then, comprises the features hereinafter fully described. The following description and the annexed drawings set forth in detail certain illustrative aspects of the disclosure. However, these aspects are indicative of but a few of the various ways in which the principles of the disclosure can be employed. Other aspects, advantages and novel features of the disclosure will become apparent from the following detailed description of the disclosure when considered in conjunction with the drawings.

The various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

The word "exemplary" is used herein to mean serving as an example, instance, or illustration. Any aspect or design described herein as "exemplary" is not necessarily to be construed as preferred or advantageous over other aspects or designs.

Figure 1:
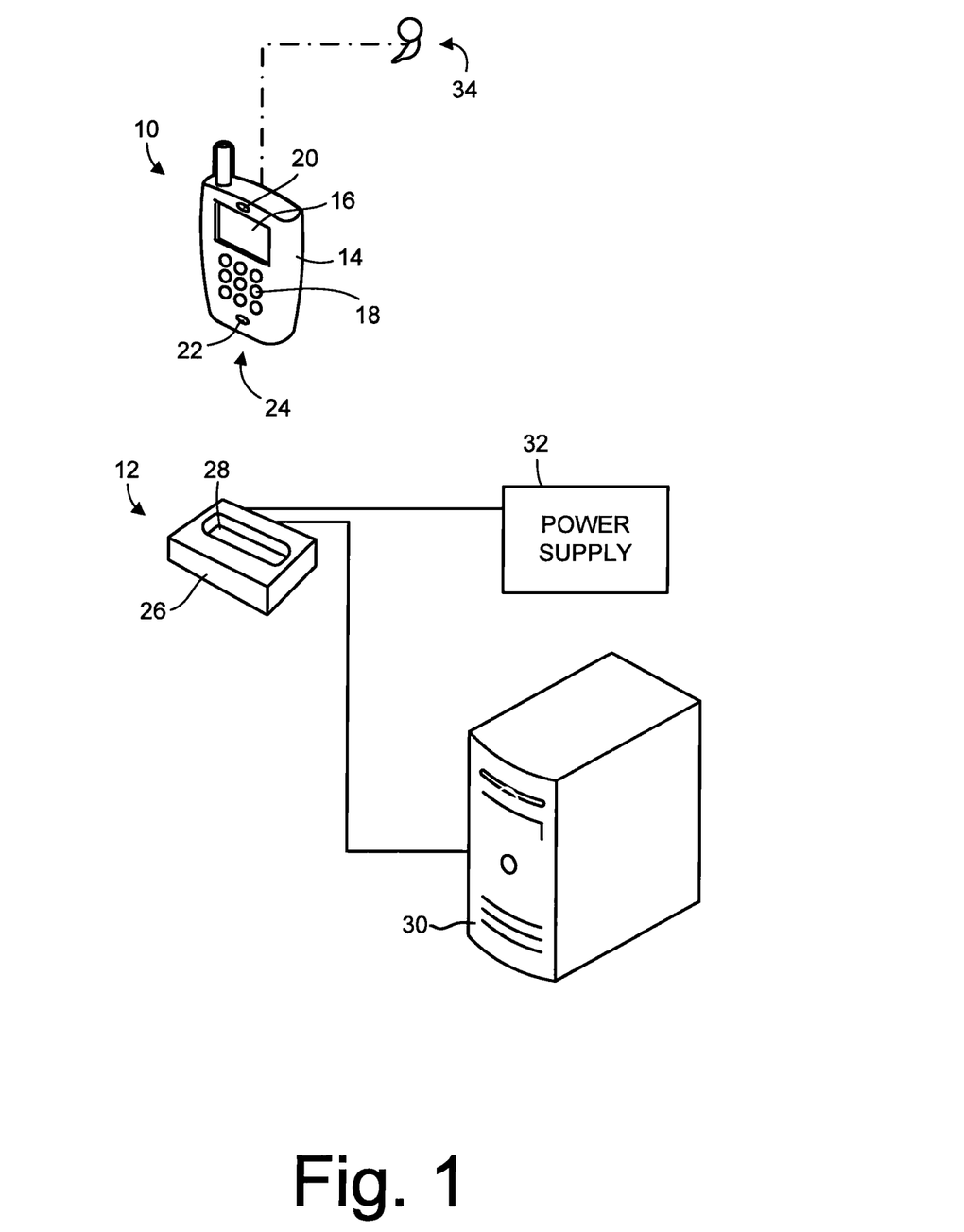
FIG. 1 is an illustration of a mobile communication device and a docking station in which the mobile communication device is undocked in the docking station.
Figure 2:
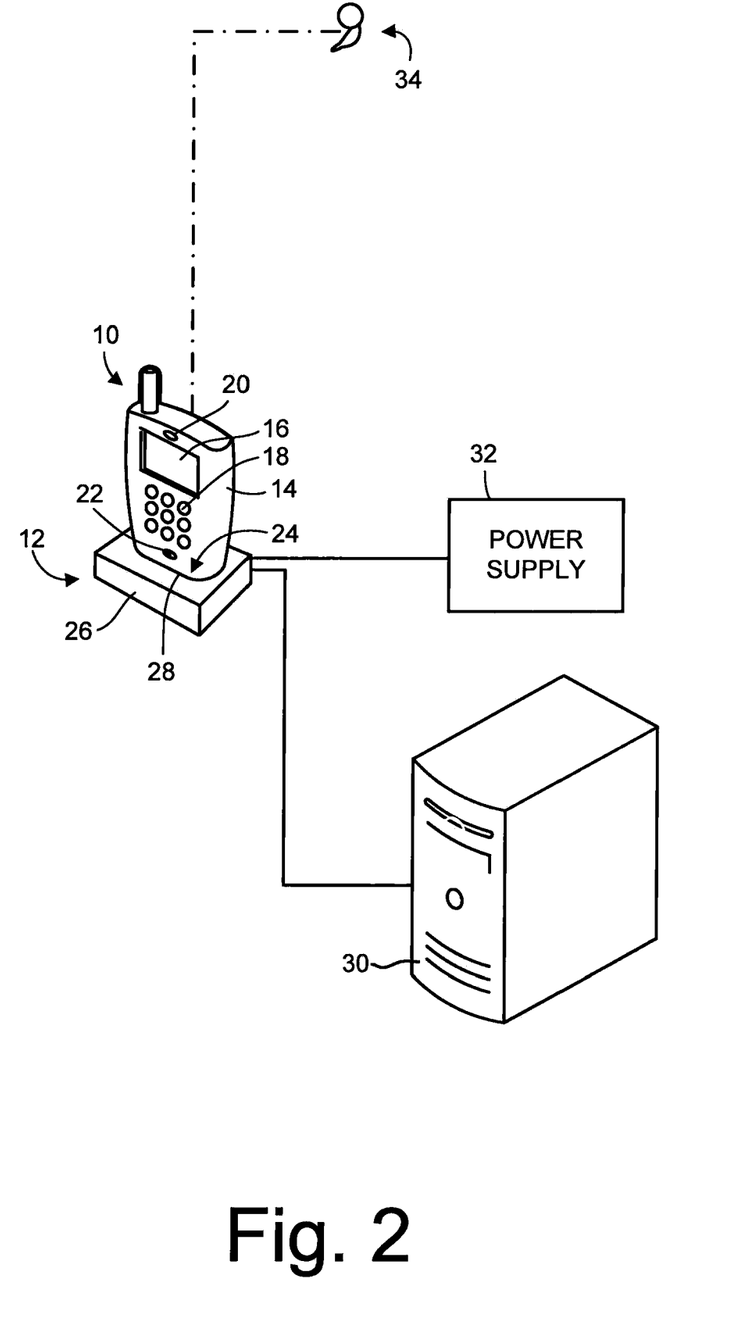
FIG. 2 is an illustration of a mobile communication device and the docking station of FIG. 1 in which the mobile communication device is docked in the docking station.

Referring first to FIGS. 1 and 2, a mobile communication device 10 and a docking station 12 are shown. The mobile communication device 10 is selectively received in the docking station 12. As shown in FIG. 1, the mobile communication device 10 is in an undocked state in which the mobile communication device 10 is not received in the docking station 12. As shown in FIG. 2, the mobile communication device 10 is in a docked state in which it is received in the docking station 12.

The mobile communication device 10 includes a body 14 having a display screen 16 and a set of controls 18. Although the set of controls 18 are shown as a plurality of buttons, the set of controls 18 could include buttons, knobs, dials, turnwheels, trackballs, jogballs and the like, or any combination thereof. Further, the set of controls 18 could be integrated with the display screen 16 in the form of a touch screen. The body 14 of the mobile communication device 10 also has a speaker 20 and a microphone 22 for allowing the mobile communication device 10 to serve as a mobile phone, a music player, a voice note recorder, or the like. The mobile communication device 10 has a docking portion 24 which includes a connector (not shown) or the like configured for engaging the docking station 12, which will be described in further detail below.

The mobile communication device 10 communicates with a wireless network and is adapted to send or receive data over the wireless network. The data transmitted over this network includes voice data such that the mobile communication device 10 can serve as a mobile phone. However, other types of data could also be sent over the wireless network to the mobile communication device 10.

Optionally, a headset 34 may be coupled to the mobile communication device 10 such that audio is routed from the mobile communication device 10 to the headset 34. Accordingly, the headset 34 has a speaker and a microphone (not shown) through which the audio is routed. The headset 34 may be in wired communication with the mobile communication device 10 or may be in wireless communication with the mobile communication device 10.

The mobile communication device 10 has a number of operation modes for routing the audio when the mobile communication device 10 is in use. These operational modes include, but are not limited to, a handset operation mode, a speakerphone operation mode, and a headset operation mode. The operation mode can be manually changed using the set of controls 18. However, as will be described in further detail below, the operation mode can also be automatically changed depending, at least in part, on the docking state of the mobile communication device 10 within the docking station 12.

In the handset operation mode, the mobile communication device 10 is configured to be held against the user's head as a handset. In this mode, the volume of the audio coming from the speaker 20 is set at a level appropriate for the proximity of the speaker 20 to the user's ear. Likewise, the sensitivity of the microphone 22 is set at a level appropriate for the relatively close proximity of the user's mouth to the microphone 22.

In the speakerphone operation mode, the mobile communication device 10 is configured to be placed at some nontrivial distance from the user's head. For example, it is contemplated that when in speakerphone operation mode, the speaker 20 of the mobile communication device 10 will be placed two or more inches from the ear of the user. In this mode, the user could hold the mobile communication device 10, set the mobile communication device 10 down on a surface, or place the mobile communication device 10 in the docking station 12. Regardless of the exact placement of the mobile communication device 10, the volume of the speaker 20 is increased relative to the volume of the speaker 20 in the handset operation mode, such that the audio can be clearly heard by the user at a distance from the speaker 20. As the user's mouth is now also at an increased distance from the mobile communication device 10, the sensitivity of the microphone 22 may also be increased relative to the sensitivity of the microphone 22 in the handset operation mode.

Additionally, when a headset 34 is coupled to mobile communication device 10, the mobile communication device 10 may have a headset operation mode in which the audio is routed to the headset 34. In headset operation mode, the user wears a headset 34 on her head, which separately contains a speaker and a microphone. As the speaker and microphone in the headset 34 are used by the user, the speaker 20 and microphone 22 of the mobile communication device 10 are disabled.

As used herein the term "non-speakerphone operation mode" refers to any operation mode that is not speakerphone operation mode and, depending on the embodiment, may include the handset operation mode and/or the headset operation mode.

It is contemplated that the audio being routed by the mobile communication device 10 could be any one of a number of types of audio activity. The types of audio activity include, but are not limited to, phone calls, music playback, voice note recording, and the like.

Turning now to the docking station 12, the docking station 12 includes a body 26 having a bay 28 for selectively receiving the docking portion 24 of the mobile communication device 10. The bay 28 may be sized to match the docking portion 24 of the mobile communication device 10 or may have an adaptor (not shown) that fits in the bay 28 to accommodate for size or shape of the docking portion 24 of the mobile communication device 10. It is well known to utilize such adaptors if the docking station 12 is a universal docking station for receiving various types of devices each having docking portions with different profiles.

The docking station 12 also includes a connector (not shown) for engagement with the connector of the mobile communication device 10. When the mobile communication device 10 is docked in the docking station 12, the connecters of each may be joined to one another.

This connection may serve multiple functions. For example, this connection provides a data connection between the mobile communication device 10 and a device such as, for example, a computer 30 in communication, either wired or wirelessly, with the docking station 12. Further, this connection between the mobile communication device 10 and the docking station 12 may also be used to recharge the mobile communication device 10 if the docking station 12 is connected to a power source 32.

In some forms of the present disclosure, it is contemplated that in the docked state the mobile communication device 10 could be received in the docking station 12, but that the docking station 12 does not serve any function (e.g., provide power, transmit data, or the like) other than receiving the mobile communication device 10.

Figure 3:
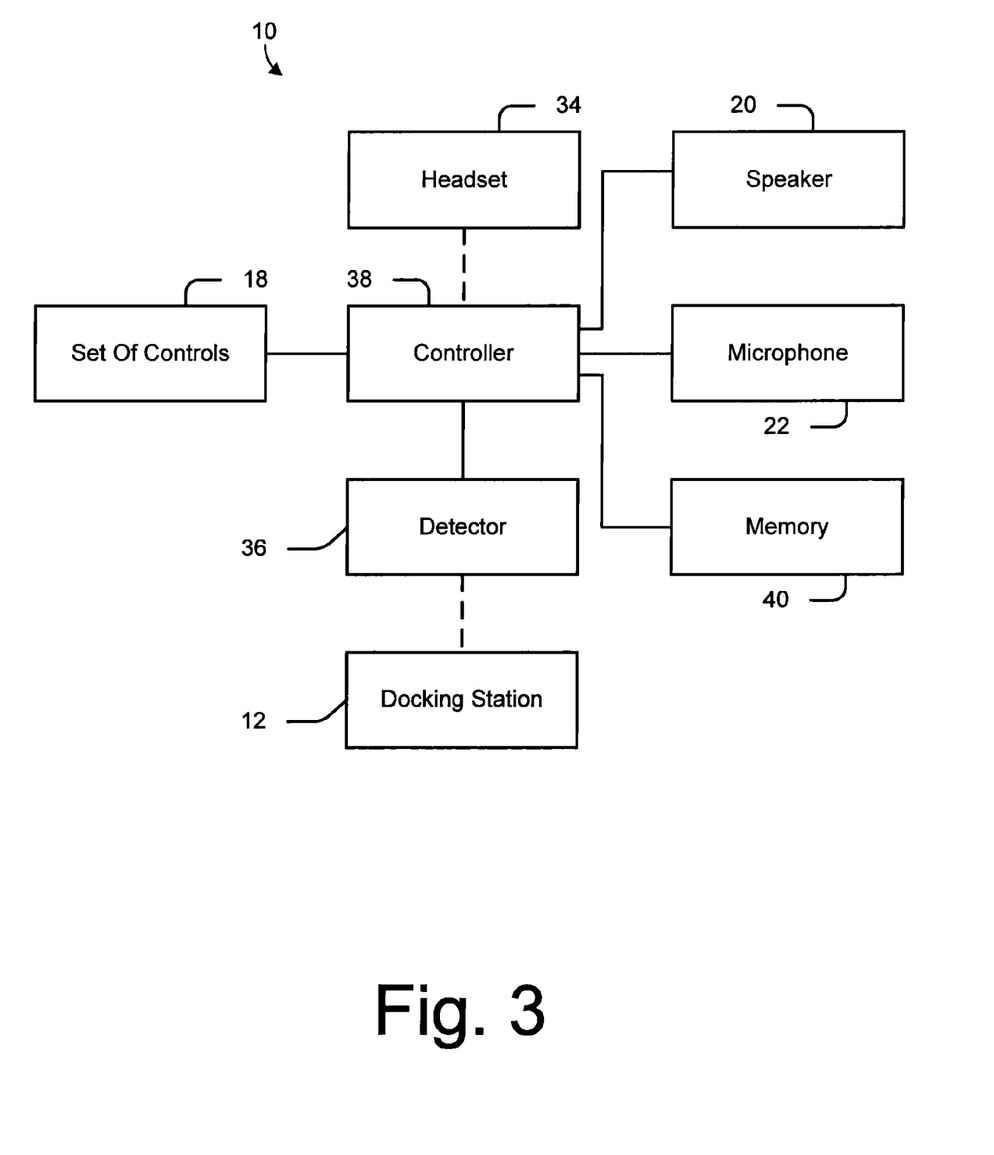
FIG. 3 is a schematic of the mobile communication device.

Now with additional reference to FIG. 3, the mobile communication device 10 also includes a detector 36, a controller 38, and a memory 40. The detector 36 and the memory 40 are each in communication with the controller 38. Although the detector 36, the controller 38, and memory 40 are described as separate elements, it should be appreciated that they could be combined in a single integrated circuit or have shared portions that provide functionality as described below to one or more of the detector 36, the controller 38, and the memory 40.

The detector 36 detects whether the mobile communication device 10 is placed in the docking station 12. The detector 36 may be any type of electrical, mechanical or electromechanical structure that provides the mobile communication device 10 with information as to whether the mobile communication device 10 is received in the docking station 12. In one exemplary embodiment, the detector 36 electrically detects if a connector on the mobile communication device 10 has formed a connection with a connector on the docking station 12. In another exemplary embodiment, the detector 36 is a mechanical tab or lever that is displaced upon the reception of mobile communication device 10 in the docking station 12. The displacement of the mechanical lever or tab changes the state of an electrical switch in an electrical circuit that determines the docking state.

The controller 38 is capable of changing the operation mode of the mobile communication device 10. The controller 38 may employ logical conditions, such as the ones shown below in FIGS. 4 and 5, to set the operation mode of the mobile communication device 10 based, at least in part, on the docking state of the mobile communication device 10 provided by the detector 36. The controller 38 may take any of a number of forms, but in an exemplary embodiment the controller 38 is integrated with the circuitry of the mobile communication device 10 that connects to the speaker 20, the microphone 22, the detector 36, and the other operational components of the mobile communication device 10 including the set of controls 18. In some forms, the set of controls 18 can be used to manually instruct the controller to change the operation mode.

The controller 38 also has access to the memory 40. The controller 38 may read data from and write data to the memory 40. The memory 40 may take any one of a number of forms known to those skilled in the art. In some forms, the memory 40 could incorporate a semiconductor or magnetic material to store the data.

Figure 4:
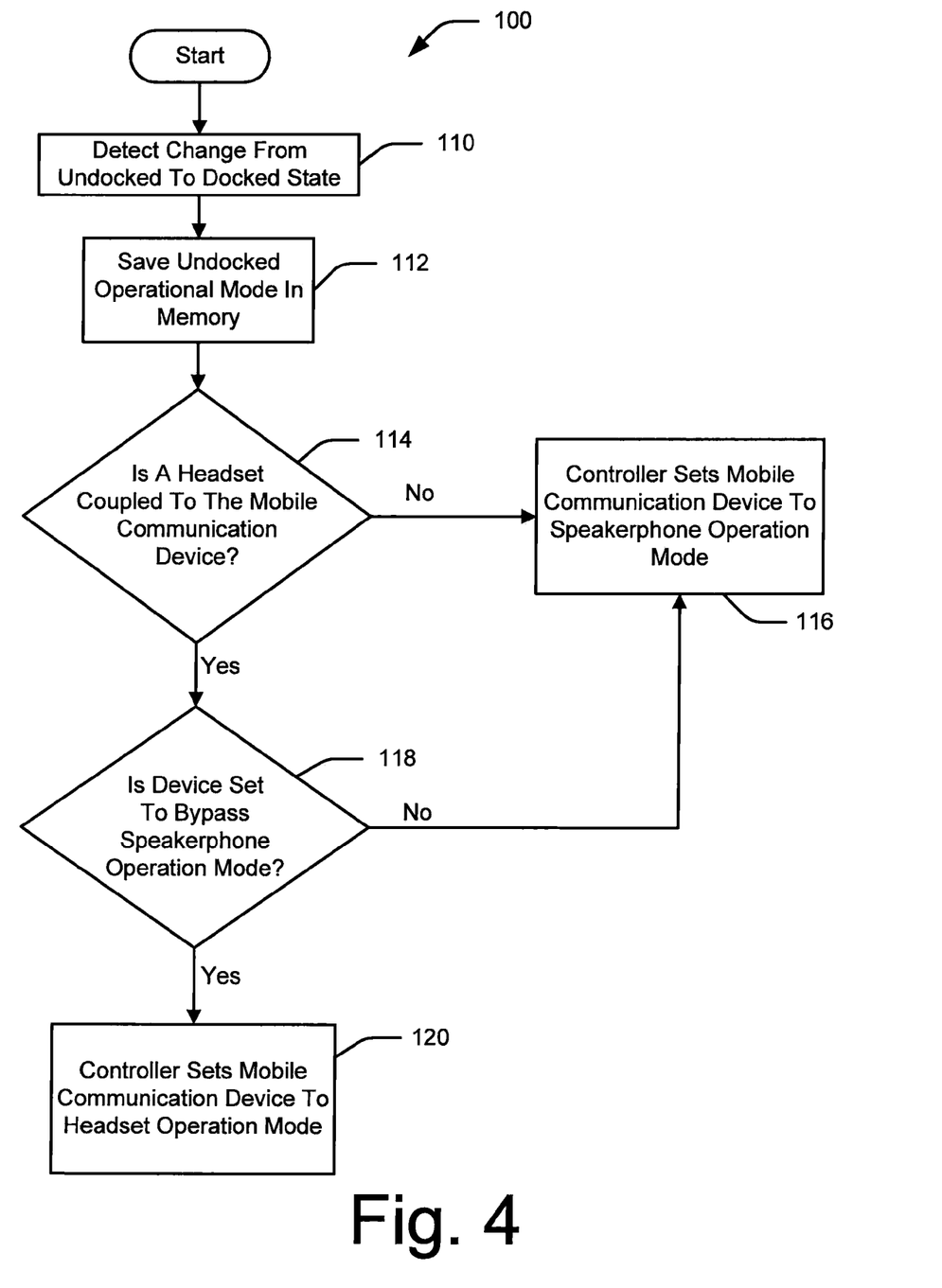
FIG. 4 is a flow chart showing the selection of an operational mode of the mobile communication device when the mobile communication device changes from the undocked state to the docked state.
Figure 5:
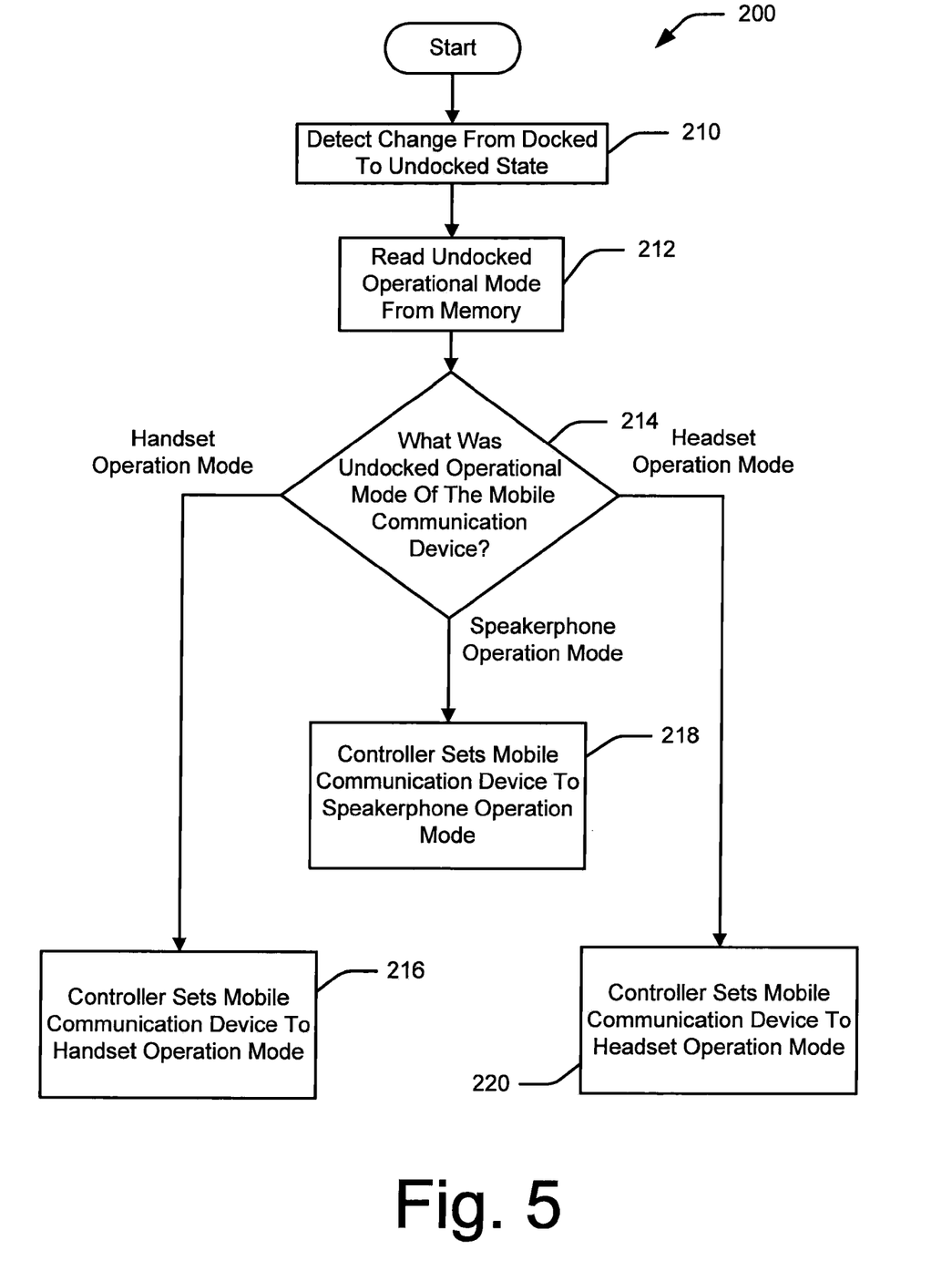
FIG. 5 is a flow chart showing the selection of the operational mode of the mobile communication device when the mobile communication device changes from the docked state to the undocked state.

Referring now to FIGS. 4 and 5, flow charts are shown that outline exemplary processes used to automatically toggle the operation mode of the mobile communication device 10 when a change in the docked state is detected.

Referring first to FIG. 4, a process 100 is illustrated that shows the conditional logic used to set the operation mode when the mobile communication device 10 changes from the undocked state to the docked state. First, in step 110, the detector 36 detects a change in docking state of the mobile communication device 10 from the undocked state to the docked state. Once this change has been detected, the mobile communication device 10 saves the undocked operational mode (i.e., the operation mode before the docking occurred) to the memory 40 in step 112.

Next, a condition is checked in step 114 to determine whether a headset 34 is coupled to the mobile communication device 10.

If there is no headset 34 coupled to the mobile communication device 10, then the controller 38 automatically sets the mobile communication device to speakerphone operation mode as in step 116. Depending on whether or not the mobile communication device 110 was operating in handset operation mode or speakerphone operation mode in the first place, this may or may not actually require a change in the operation mode.

If there is a headset 34 coupled to the mobile communication device 10, then the controller 38 may further determine whether the mobile communication device 10 is set to bypass speakerphone operation mode when the headset 34 is present as in step 118. This bypass option may be set, for example, by the user via manipulation of the set of controls 18 of the mobile communication device 10. The bypass option essentially allows the user to select a preference as whether to continue routing audio to the headset 34 upon the docking of the mobile communication device 10 by setting the mobile communication device 10 to headset operation mode as in step 120 or to set the mobile communication device 10 to speakerphone operation mode as in step 116 based on the new docked state.

It should be appreciated that some of these steps may not be required for the conditional toggling based on the docking state. For example, it may not be necessary that the mobile communication device 10 retain the undocked operational mode in memory. Further, the mobile communication device 10 could also skip step 114 and always automatically set the mobile communication device 10 to speakerphone operation mode upon docking. Omitting step 114 would be akin to making an assumption either that no headset 34 is present (as some mobile communication devices may not even be capable of coupling to a headset) or that if the user places the mobile communication device 10 in the docking station 12 that the user must intend to use the mobile communication device 10 in the speakerphone operation mode.

Referring next to FIG. 5, a process 200 is illustrated that reveals the conditional logic used to determine whether a change in operational mode is necessary upon the undocking of the mobile communication device 10 from the docking station 12. First, in step 210, the detector 36 detects that the mobile communication device 10 has been undocked from the docking station 12. Upon detecting this change, in step 212, the controller 38 reads the memory 40 to recall the previously stored undocked operational mode as stored in step 112 of process 100. In step 214, this undocked operational mode is used to determine which operation mode the mobile communication device should be set to. If the undocked operational mode was previously set to handset operation mode, then the controller 38 sets the mobile communication device 10 to handset operation as in step 216. If the undocked operational mode was set to speakerphone operation mode, then the controller 38 sets the mobile communication device 10 to speakerphone operational mode as in step 218. Likewise, if the undocked operational mode was set to headset operation mode, then the controller 38 sets the mobile communication device 10 to headset operation mode as in step 220.

As previously indicated with respect to the docking process 100, the "setting" operation that occurs during steps 216, 218 and 220 may or may not actually require a change in the operation mode since it may be the case that the mobile communication device 10 is already in the operation mode that the process 200 indicates the mobile communication device 10 should now be set to. This may be the case, for example, when an undocked mobile communication device is being used in speakerphone operation mode, is docked in the docking station (remaining in speakerphone operation mode), and is then later undocked from the docking station (again, remaining in speakerphone operation mode). This may also be the case if the mobile communication device 10 is set to headset operation mode and the bypass option is set so that the mobile communication device 10 does not switch over to speakerphone operation mode upon docking. Again, on undocking, a change in operational state will not be necessary as the mobile communication device 10 is already set to headset operation mode.

Other steps may also be incorporated into these processes 100 and 200 to consider other conditions set by the user or detected by the mobile communication device 10. However, in any case, the operation mode of the mobile communication device 10 is at least in part dependent on a docking or undocking operation.

The change in operation mode could occur regardless of whether the mobile communication device 10 is currently in use. While a change in audio routing has been described when the mobile communication device 10 is in use (e.g., a phone call is in progress), it is contemplated that, even when the mobile communication device 10 is not in use, a docking or undocking event could change the operation mode. Then, the next time the mobile communication device 10 is used (e.g., the user makes or receives a call) the audio is routed according to the operation mode selected by the controller 38 during the docking event. The event initiating the use of the mobile communication device 10 includes, but is not limited to, making a phone call, receiving a phone call, playing audio (such as music), recording a voice note, and the like.

Thus, an improved mobile communication device and method of automatically conditionally toggling between operation modes thereof is disclosed. The device and method provide event-driven conditional toggling of the operation state based on a docking event. When appropriate, a docking event causes the mobile communication device to automatically and intuitively switch to a speakerphone operation mode. Upon the undocking of the mobile communication device, the mobile communication device may return to its initial operation mode.

Thus, it is not required that the user manually toggle the operational mode during docking or undocking. This provides for more fluid operation of the device and eliminates the need for the user to manually perform actions that have been performed automatically.

Further, as the present disclosure incorporates the use of a speakerphone operation mode available in the mobile communication device, in many cases, no new specialized hardware is required. For many mobile communication devices a firmware update or the like could be used to properly configure the hardware of the mobile communication device to serve as the detector and controller.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To apprise the public of the scope of this disclosure, the following claims are made:

What is claimed is:

1. A mobile communication device adapted to be selectively received in a docking station, the mobile communication device having a speakerphone operation mode and a non-speakerphone operation mode including a headset operation mode when a headset is coupled to the mobile communication device, the mobile communication device comprising:
    a detector configured to detect a change in a docking state of the mobile communication device into and out of the docking station; and
    a controller configured to conditionally toggle the mobile communication device between the speakerphone operation mode and the non-speakerphone operation mode depending on the docking state of the mobile communication device and whether the mobile communication device is set to bypass a speakerphone operation mode whilst the headset is coupled to the mobile communication device;
    wherein, when the mobile communication device is operating in the headset operation mode, the detector detects a change to a docked state, and the mobile communication device is set to bypass the speakerphone operation mode, then the mobile communication device continues to operate in the headset operation mode rather than toggling to the speakerphone operation mode.

2. The mobile communication device of claim 1, wherein, when the mobile communication device is changed from an undocked state to the docked state, the controller is configured to toggle the mobile communication device to speakerphone operation mode if the bypass is not set to bypass the speakerphone operation mode.

3. The mobile communication device of claim 1, wherein, when the mobile communication device is changed from the docked to an undocked state, the controller is configured to toggle the mobile communication device to the non-speakerphone operation mode.

4. The mobile communication device of claim 1 wherein the mobile communication device includes a memory configured to store an undocked operational mode of the mobile communication device, the undocked operational mode being one of the speakerphone operation mode and the non-speakerphone operation mode, and wherein when the mobile communication device changes from the docked state in which the mobile communication device is set to speakerphone operation mode to an undocked state, the controller is configured to set the mobile communication device to the undocked operational mode.

5. The mobile communication device of claim 4, wherein the controller further comprises a user control for selecting the undocked operational mode of the mobile communication device.

6. The mobile communication device of claim 1, wherein the non-speakerphone operation mode includes a handset operation mode.

7. A method of conditionally setting an audio operation mode for a mobile communication device having a headset coupled thereto upon receipt of the mobile communication device in a docking station, the method comprising:
    detecting a change in the mobile communication device from an undocked state outside the docking station to a docked state in the docking station;
    thereafter, determining whether the mobile communication device is set to bypass a speakerphone operation mode whilst the headset is coupled to the mobile communication device and either:
        setting the mobile communication device to a headset operation mode if the mobile communication device is set to bypass the speakerphone operation mode; or
        setting the mobile communication device to the speakerphone operation mode if the mobile communication device is not set to bypass the speakerphone operation mode.

8. The method as in claim 7, wherein when the mobile communication device is docked in the docking station, the docking station recharges the mobile communication device.

9. The method as in claim 7, wherein when the mobile communication device is docked in the docking station, the docking station transmits data with the mobile communication device.

10. The method as in claim 7, further comprising switching the mobile communication device from the speakerphone operation mode to a non-speakerphone operation mode when the mobile communication device changes from a docked state to an undocked state.

11. The method of claim 7, further comprising the steps of:
    storing an undocked operational mode of the mobile communication device, the undocked operational mode being one of the speakerphone operation mode and a non-speakerphone operation mode;
    upon detection of the change of the mobile communication device from the undocked state to the docked state, setting the mobile communication device to speakerphone operation mode; and
    detecting a change of the mobile communication device from the docked state to the undocked state and thereafter setting the mobile communication device to the undocked operational mode.

12. The method of claim 11, wherein the non-speakerphone operation mode includes a handset operation mode.

* * * * *